C. J. IVERS.
NUT LOCK.
APPLICATION FILED MAR. 8, 1912.
1,047,064.
Patented Dec. 10, 1912.
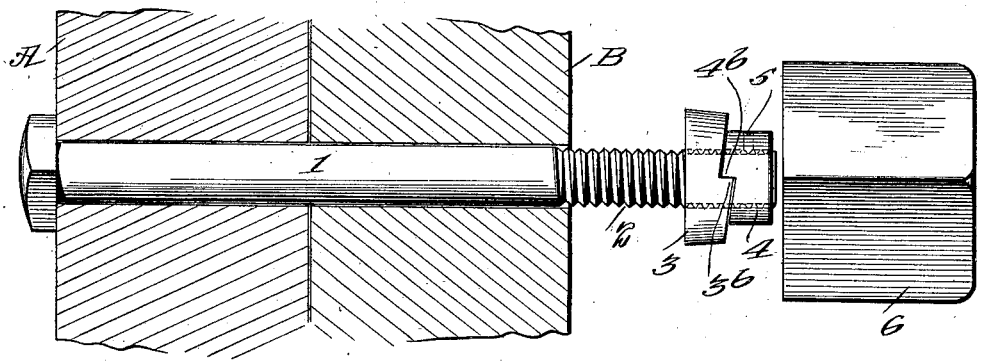
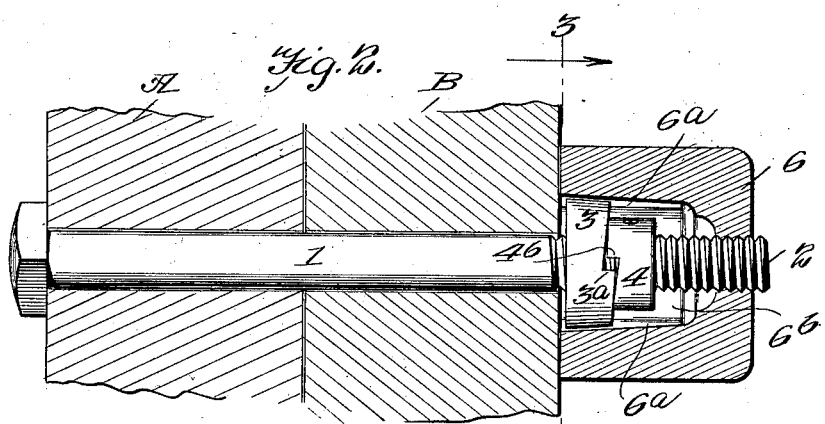
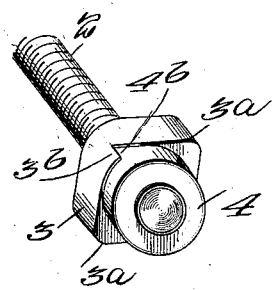
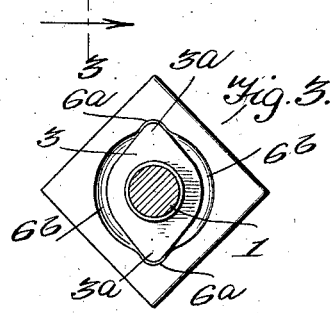
WITNESSES
INVENTOR
CHRIS J. IVERS,
BY
ATTORNEYS

UNITED STATES PATENT OFFICE.

CHRIS J. IVERS, OF RUSHMORE, MINNESOTA.

NUT-LOCK.

1,047,064. Specification of Letters Patent. Patented Dec. 10, 1912.

Application filed March 8, 1912. Serial No. 682,358.

*To all whom it may concern:*

Be it known that I, CHRIS J. IVERS, a citizen of the United States, and a resident of Rushmore, county of Nobles, and State of Minnesota, have invented certain new and useful Improvements in Nut-Locks, of which the following is a specification.

My invention relates to improvements in means for retaining nuts on bolts, and it consists in the combinations, constructions and arrangements herein described and claimed.

An object of my invention is to provide a nut which may be screwed upon a bolt, but which, when once adjusted, is prevented from becoming unloosened, and which will, in fact, have to be cut off if it is ever removed.

A further object of my invention is to provide a simple and inexpensive form of device for absolutely preventing the removal of the nut by unscrewing it when it is once in position.

Other objects and advantages will appear in the following specification, and the novel features of the device will be particularly pointed out in the appended claims.

My invention is illustrated in the accompanying drawings forming part of this application, in which:—

Figure 1 is a view showing the position of the parts prior to the application of the nut; Fig. 2 is a section through the nut after it has been applied; Fig. 3 is a section along the line 3—3 of Fig. 2 looking in the direction of the arrows; and, Fig. 4 is a perspective view of a portion of the bolt with the auxiliary nuts upon the same.

In carrying out my invention I make use of a bolt 1 of the ordinary form, and provided with a threaded end 2. Arranged to engage the end 2 are a pair of auxiliary nuts like those shown at 3 and 4. The former tapers slightly from its forward face to its rear face, and has somewhat of a diamond shape, as will be seen from Figs. 3 and 4. The rear face is provided with a shoulder $3^b$. The second auxiliary nut, 4, is of a cylindrical shape, and is provided with a shoulder $4^b$ on its front face arranged to engage the shoulder $3^b$ of the auxiliary nut 3. This nut is also provided with a set screw 5 which extends inwardly toward the threads of the bolt. The main nut 6 is provided with recesses $6^a$, as will be seen from Figs. 2 and 3 arranged to receive the angular portions $3^a$ of the auxiliary nut 3, while the main recess $6^b$ receives the body portions of both the nuts 3 and 4. The rear end of the nut 6 is threaded to receive the end 2 of the bolt.

From the foregoing description of the various parts of the device the operation thereof may be readily understood. In Fig. 1 I have shown the bolt 1 as passing through two beams A and B which are to be bolted together. The auxiliary nuts 3 and 4 are placed together so that the shoulders $3^b$ and $4^b$ are in contact, and then both nuts are screwed on to the end of the bolt until they assume the position shown in Fig. 1. The set screw 5 is now screwed inwardly until its point bears on the groove between the threads of the bolt so as to cause the nut 4 to turn hard, but not to entirely prevent it from turning. The device is now ready to receive the large nut 6. The latter is placed over the auxiliary nuts, the recesses $6^a$ receiving the angular portions $3^a$. The large nut may now be turned by a wrench, or other suitable tool, and it will cause both of the auxiliary nuts to turn forwardly since the auxiliary nut 3 will cause the auxiliary nut 4 to turn by the engagement of the shoulders $3^b$ and $4^b$ as heretofore explained. The turning of the large nut is continued until the nut has engaged the threads of the bolt. Further turning forces the nut against the member B. It is obvious that the nut 6, when in position, is held permanently in place. Any attempt to unscrew the nut 6 will be fruitless as the nut 6 cannot be turned backward without turning the nut 3 backward. But the rear face of the nut 3 is in contact with the front face of the nut 4. This tends to force the nut 4 backward, causing the nut to bind on the threads of the bolt, and the latter is held from turning backward by the frictional resistance of the set screw 5. Since the nut 6 cannot be turned backward unless the nut 3 is, it will be seen that the nut 6 cannot be removed when once in position. The only way to get the nut off is to cut it off.

This device is designed for use on structures in which the permanent position of the nut is desired. The device is simple in its nature, and is easily manipulated.

I claim:—

1. The combination with a threaded bolt of a main nut therefor having a recess, and a pair of auxiliary nuts arranged to enter said recess, one of said nuts being adapted to be rotated by engagement with said main nut, and the second of said auxiliary nuts serving as a lock nut for said first-named auxiliary nut.

2. The combination with a threaded bolt of a main nut therefor having a recess, a pair of auxiliary nuts arranged to enter said recess, one of said nuts being adapted to be rotated by engagement with said main nut, and the second of said auxiliary nuts serving as a lock nut for said first named auxiliary nut, and an adjustable friction member carried by said second auxiliary nut and arranged to engage the threads of the bolt.

3. The combination with a threaded bolt, of a main nut therefor having a recess, a pair of auxiliary nuts arranged to enter said recess, one of said nuts being adapted to be rotated by engagement with said main nut, each of said nuts being provided with shoulders, the second of said auxiliary nuts being arranged to be rotated by the engagement of its shoulder with that of the first auxiliary nut, and said second auxiliary nut serving as a lock nut for said first named auxiliary nut, and a set screw carried by said second auxiliary nut and arranged to engage the threads of the bolt to increase the friction of the second named auxiliary nut on the bolt.

CHRIS J. IVERS.

Witnesses:
E. S. WEMPLE,
M. A. MATTISON.

---

Copies of this patent may be obtained for five cents each, by addressing the "Commissioner of Patents, Washington, D. C."